2,801,258
ORGANO TIN COMPOUNDS AND COMPOSITIONS CONTAINING SAME

Ernest W. Johnson, Westfield, N. J., assignor to Metal & Thermit Corporation, New York, N. Y., a corporation of New Jersey No Drawing. Application July 7, 1951, Serial No. 235,674

2 Claims. (Cl. 260—429.7)

The present invention relates to a new organotin mercaptide compound, the method of making the same and a resin composition containing the organotin mercaptide as a stabilizer.

In accordance with the present invention, a new compound has been developed classified as an organotin mercaptide and having the formula $R_nSn(SR')_{4-n}$, in which R is a group of the class consisting of an alkyl, aryl and heterocycle in substituted and unsubstituted form, R' is a group of the class consisting of alkyl, aryl and heterocycle in substituted and unsubstituted form and $n$ is a number from one to three. The R groups and the R' groups need not all be the same.

The organotin mercaptide of the present invention is particularly useful as a stabilizer for vinyl resin and is also useful as a rubber accelerator, rubber anti-oxidant, lube oil additive and polymerization accelerator. In connection with vinyl resin, it has been found that the organotin mercaptide of the character described when added to the vinyl resin in amounts equivalent to 0.5 to 10.0 parts by weight of stabilizer to 100 parts of the resin is effective as a stabilizer. However, for commercial use, 1.0 to 3.0 parts by weight of stabilizer to 100 parts by weight of resin is preferred.

I have found that organotin oxides ($R_2SnO$), organotin hydroxides ($R_3SnOH$) and stannonic acids ($RSnO_2H$) will react with primary, secondary and tertiary mercaptans to yield derivatives of the types $R_2Sn(SR')_2$, $R_3SnSR'$ and $RSn(SR')_3$. The reactions for such preparations are as follows:

$$R_2SnO + 2R'SH \rightarrow R_2Sn(SR')_2 + H_2O$$
$$R_3SnOH + R'SH \rightarrow R_3SnSR' + H_2O$$
$$RSnO_2H + 3R'SH \rightarrow RSn(SR')_3 + 2H_2O$$

In accordance with another process for preparing these derivatives, the starting material is an organotin halide. It has been determined in accordance with the present invention, that organotin halides such as $R_3SnX$, $R_2SnX_2$ and $RSnX_3$ will react with mercaptan in the presence of basic HCl acceptors, such as alkali metal and alkaline earth metal oxides, hydroxides, bicarbonates and carbonates, and specifically sodium hydroxide or sodium carbonate to yield the same types of derivatives through the replacement of the halide group by the SR' group.

The following examples illustrate certain ways in which the organotin mercaptide of the present invention can be prepared:

Example I

One-half mole of ethyl mercaptan and one quarter mole of dibutyltin oxide were refluxed with stirring in toluene solution. Gradually the dibutyltin oxide dissolved. At this stage, the water of reaction was withdrawn by use of a Barrett moisture trap. After the theoretical water was removed, toluene was removed by a downward vacuum distillation. The final pot temperature was 120° C. and the final pressure was 10 mm of Hg. The product weighed 85.5 g. and by analysis contained 33.5% Sn and 16.9% S.

Example II

One-half mole of normal butyl mercaptan, one-quarter mole of dibutyltin oxide and 200 ml. of toluene were heated to reflux. The water of reaction was removed by the use of a moisture trap. Solution of the oxide occurred before all the water was removed. After removal of the water, toluene was stripped out by use of a downward vacuum distillation to yield a final nearly odorless residue. This liquid residue weighed 99.7 g. and contained 28.7% Sn and 15.0% S.

Example III

One-half mole of isobutyl mercaptan, 0.25 mole of dibutyltin oxide and 200 ml. of toluene were refluxed with stirring until solution of the oxide occurred and the theoretical water was obtained. The toluene was vacuum-stripped to leave a light colored liquid product which analyzed 28.8% tin and 15.2% sulfur.

Example IV 0.198 mole of sec. butyl mercaptan (prepared from sec. butyl bromide and thiourea by a modification of the process by Urquhart and co-workers, (Organic Synthesis, vol. 21, page 36, John Wiley & Sons, New York (1941)), and 0.099 mole of dibutyltin oxides were heated with 200 ml. of toluene until the theoretical water was removed. The toluene was stripped and a light liquid product resulted. Analysis indicated 28.2% Sn and 14.6% S.

Example V

One-half mole of n-amyl mercaptan, 0.25 mole of dibutyltin oxide and 200 ml. of toluene were heated (with mechanical stirring) to reflux. The oxide was completely dissolved after 20 minutes of heating (temperature had only reached 91° C.), while the water was distilling over into a Barrett moisture trap. After the theoretical water (4.5 ml.) was removed, heating was continued for 2.5 hours. The solution was then cooled, filtered and stripped of solvent to a pot temperature of 125° C. at a pressure of 2 mm. The product was a light colored liquid weighing 106.9 grams. Analysis indicated 26.9% Sn; 14.6% S.

Example VI 0.088 mole of triphenyltin hydroxide, 0.088 mole of predominately lauryl mercaptan, hereinafter referred to as "'lauryl' mercaptan, Hooker" (Hooker Electrochemical Company's product which approximates $C_{13}H_{27}SH$, being a mixture of normal $C_{10}$, $C_{12}$, $C_{14}$, $C_{18}$ mercaptans, with $C_{12}$ predominating), and 50 ml. of toluene were heated (stirring) to reflux. After removal of the water of reaction, the mixture was cooled, filtered and filtrate stripped of solvent. The product weighing 37.8 grams contained 18.9% Sn and 6.0% S.

Example VII

One-half mole of n-amyl mercaptan, 0.25 mole of dilauryltin oxide and 150 ml. of toluene were heated and stirred at reflux. After the water was removed, the mixture was cooled, filtered and stripped. The product was a light colored liquid weighing 80.2 grams, contained 17.4% Sn and 9.6% S.

Example VIII

One-half mole of n-hexyl mercaptan, 0.25 mole of dibutyltin oxide and 200 ml. of toluene were heated to reflux. After the water of reaction was removed, the mixture was stripped of solvent. A residual light colored liquid was obtained in 97% yield. Analysis showed 25.2% Sn and 13.5% S.

Example IX

One mole of ter-hexyl mercaptan, 0.5 mole of dibutyltin oxide and 400 ml. of toluene were heated to reflux. After the theoretical water was removed, the product was filtered hot to remove an insoluble precipitate (weight, 24.6 g.; analysis, 44.9% Sn). After vacuum stripping and cooling, the filtrate deposited 25.0 grams of a solid which was filtered off. This solid contained 42.28% Sn. The final filtrate was a light tan liquid weighing 143.9 grams. Analysis indicated 23.4% Sn.

Example X

One-half mole of n-heptyl mercaptan, 0.25 mole of dibutyltin oxide and 200 ml. of toluene were heated to reflux, the water of reaction removed, and the mixture filtered. After stripping to a temperature of 115° C. and a pressure of 2.5 mm., the filtrate left a very light colored liquid residue (125.2 grams) which analyzed 23.8% Sn and 12.6% mercapto sulfur.

Example XI

One-half mole n-octyl mercaptan, 0.25 mole of dibutyltin oxide and 200 ml. of toluene were treated as in Example X. The product was a light colored viscous liquid weighing 135.9 g. The theoretical yield is 130 grams. The extra 5.9 grams arise from the mercaptan used. Most of the mercaptan used in this specification were assayed by an iodimetric titration and a quantity of the assayed mercaptan sufficient to give the desired mole quantity of titratable mercapto group (equivalent to the organotin compound) was then taken. Thus, the n-octyl mercaptan used above assayed 89.2% titratable mercaptan. A weighed quantity was taken, sufficient to contain just one-half mole of titratable SH. Analysis of the product indicated 21.5% Sn and 11.6% S.

Example XII

Dibutyltin oxide (0.162 mole, 40.3 grams), n-nonyl mercaptan (99.5% by assay; 0.325 mole; 52.0 grams), and toluene (170 ml.) were treated as described in Example X. The product weighed 85.5 grams and contained 21.5% Sn and 11.2% S.

Example XIII

Dibutyltin oxide (0.25 mole, 62.1 grams), n-decyl mercaptan (94.1% by assay; 0.5 mole; 92.6 grams), and toluene (200 ml.) were allowed to react as described in Example X. The product weighed 149 grams; it was a viscous light colored liquid containing 19.5% Sn and 10.6% S.

Example XIV

Dibutyltin oxide (0.5 mole, 124.4 grams), "'lauryl' mercaptan, Hooker" (1.0 mole; 216.0 grams), and 200 ml. of toluene were treated as described in Example X. The product weighed 324.3 grams. It was a clear colorless liquid containing 18.0% and 8.4% S.

Example XV

One mole, 202.0 grams, of tertiary lauryl mercaptan in 100 ml. of toluene was added to 40 grams (1 mole) of sodium hydroxide in 50 ml. of water. To this mixture was added 0.5 mole (151.8 grams) of dibutyltin dichloride in 200 ml. of toluene. The mixture was stirred and heated to distill out the water azeotropically. After removal of the water, the solution was filtered hot to remove the sodium chloride formed (the NaCl forms large crystals in this process). The filtrate was cooled, filtered, and vacuum stripped to remove solvent. At a final temperature of 130° C. at 3 mm. pressure, product was a light colored liquid weighing 287.7 grams. Analysis indicated 18.7% Sn, trace of Cl.

Example XVI 91.1 grams of dibutyltin dichloride and 127.7 grams of "'lauryl' mercaptan, Hooker" were heated to 65° C. in a stirred stainless steel beaker and 42 grams of anhydrous sodium carbonate was added over a 6-minute period. The temperature rose to 83° C. during this time and was held there for 1¼ hours. The mixture was filtered, and the product was a clear light colored liquid. Analysis showed 18.0% Sn, 9.7% S, 0.05% Cl.

Example XVII

One-half mole of "'lauryl' mercaptan, Hooker," 0.25 mole of dimethyltin oxide, and 100 ml. of toluene were refluxed and treated as in Example X. The product was a light colored liquid with an analysis of 19.7% Sn and 10.7% S.

Example XVIII

One and one-half moles of "'lauryl' mercaptan, Hooker," 0.5 mole of methylstannonic acid and 200 ml. of toluene were used in the process of Example X. The product was a light colored liquid, weighed 360.7 g. and contained 15.0% Sn and 12.0% S.

Example XIX

One-quarter mole of "'lauryl' mercaptan, Hooker," 0.25 mole of trimethyltin chloride and 100 ml. of toluene are heated to 65° C. as in Example XVI. Anhydrous sodium carbonate (53 grams) is then added to the mixture. Caution: This reaction must be carried out in an efficient hood as the trimethyltin chloride is very noxious. The reaction mixture is filtered hot and stripped of solvent.

Example XX

One-half mole of "'lauryl' mercaptan, Hooker," 0.25 mole of diphenyltin oxide and 200 ml. of toluene are treated as described in Example X.

Example XXI

One-quarter mole of triphenyltin chloride, one-quarter mole of "'lauryl' mercaptan, Hooker," 100 ml. of toluene and 53 grams of sodium carbonate are treated as described in Example XIX.

Example XXII

Diamyltin oxide (0.122 mole, 37.6 grams), 0.244 mole of "'lauryl' mercaptan, Hooker," and 100 ml. of toluene were treated as described in Example X. The clear light colored liquid product weighed 70.6 grams and analyzed 17.0% Sn and 8.7% S.

Example XXIII

One-quarter mole of dilauryltin oxide and 0.5 mole of "'lauryl' mercaptan, Hooker," yielded 212.6 grams of light colored liquid product. Analysis indicated 13.0% Sn and 6.9% S.

Example XXIV

One-half mole of methyltin trichloride, 1.5 moles of "'lauryl' mercaptan, Hooker," 200 ml. of toluene and 318 grams of anhydrous sodium carbonate are treated as described in Example XIX.

Example XXV

One-quarter mole of trimethyltin hydroxide, one-quarter mole "'lauryl' mercaptan, Hooker" and 100 ml. of toluene are treated by the process of Example X.

Example XXVI

One-quarter mole of tributyltin hydroxide, one-quarter mole of "'lauryl' mercaptan, Hooker" and 100 ml. of toluene are treated as described in Example X.

Example XXVII

One-quarter mole of monobutyltin trichloride, 0.75 mol of "'lauryl' mercaptan, Hooker" plus 2 moles of Na₂CO₃ and 150 ml. of toluene were used as in the process of Example XVI. The product weighed 172.3 g. and contained 13.9% Sn and 11.9% S.

Example XXVIII

One-quarter mole of ethylstannonic acid, 0.75 mole of "'lauryl' mercaptan, Hooker" and 150 ml. of toluene are treated by the process of Example X.

Example XXIX

One-eighth mole of diphenyltin oxide, one-quarter mole of benzylmercaptan and 100 ml. of toluene were treated by the process of Example X. The product contained 22.4% Sn and 12.4% S.

Example XXX

One-quarter mole of dilauryltin oxide, one-half mole of benzylmercaptan and 150 ml. of toluene were used in the process of Example X. The product contained 16.1% Sn and 9.2% S.

Example XXXI

Dibutyltin oxide, 41 grams, n-tetradecyl mercaptan (88.6% SH), 85.5 grams, and 150 ml. of toluene were carried through the process of Example X. The product analyzed 15.7% Sn and 8.85% S, and weighed 123 grams.

Example XXXII

Dibutyltin oxide, 40.8 grams, n-hexadecyl mercaptan (95.2%), 88.8 grams and 145 ml. of toluene were treated as in Example X. The product weighed 126 grams. Analysis indicated Sn, 15.1%; S, 8.3%.

Example XXXIII

Dibutyltin oxide (0.38 mole), ter-hexadecyl mercaptan (0.76 mole) and 350 ml. of toluene were treated by the process of Example X. Product weighed 265.2 grams; analysis showed Sn, 14.8%.

Example XXXIV

Dibutyltin oxide (0.25 mole), thiophenol (0.50 mole) and 200 ml. of toluene were treated as in Example X. The product was a colorless liquid, weighing 110.5 grams. Analysis showed 26.4% Sn.

Example XXXV

Dibutyltin oxide (0.218 mole), p-thiocresol (74% 0.435 mole, 73 grams), and 150 ml. of toluene were treated as described in Example X. The light colored liquid product weighed 104.6 grams and contained 23.9% Sn and 13.45% S.

Example XXXVI

Dibutyltin oxide (0.25 mole), 2-aminobenzenethiol (0.50 mole), and 200 ml. of toluene were treated as in Example X. The product was a dark colored liquid weighing 112.2 grams. Analysis indicated 25.6% Sn and 12.2% S. It required considerable treatment with decolorizing carbon to be purified sufficiently to be useful as a stabilizer in colorless vinyl chloride sheetings.

Example XXXVII

Dibutyltin oxide (0.5 mole), 2-mercaptobenzthiazole (1 mole) and 350 ml. of toluene were treated as previously described. The product was a light tan solid weighing 275 g. Analysis showed 21.0% Sn and 22.2% sulfur (by combustion). Recrystallization from 50/50 alcohol/acetone yielded a light colored crystalline product.

A general test method was used to test effectiveness of most of the products from Examples I–XXXVII as stabilizers for polyvinyl chloride resins. The resin used was Geon 101 (produced by the B. F. Goodrich Co.) unless otherwise specified.

The stabilizer was incorporated into a mixture of 100 parts by weight of resin and 50 parts by weight of a plasticizer (here Flexol DOP (dioctyl phthalate)). The weight of stabilizer was determined by its analysis. Thus enough stabilizer was used to provide the same weight of combined tin as is provided by 2 parts of dibutyltin dilauryl mercaptide (0.374 part of Sn by weight). This was done in order to determine the relative merits of the various compounds.

The mixture was then milled for 5 minutes on a two-roll differential speed mill heated to 320–325° F. and removed as a sheet. Portions of the sheet were then placed in a single cavity mold (6" x 6" x 40 mils) preheated to 275° F. The mold was placed on a press and raised to 320° F. under 10,000 pounds total pressure. When the mold reached 320° F., the pressure was increased to 40,000 pounds and held until the temperature reached 330° F. This procedure required 5 to 5½ minutes. The mold and press platens were then cooled and the pressed sheet removed.

The pressed sheet was cut into 1" x 6" strips and placed in clips on a tray so that the strips would hang vertically. The tray was then placed in a circulating air oven held at 320° F. Samples were removed after one hour, two hours, three hours and four hours of heat aging. Samples were rated visually. Summary of the tests are indicated as follows:

SUMMARY TABLE

Code: c, colorless; vsy, very slight yellowing; sy, slight yellowing; y, yellowed; rbr, reddish brown; br, brown; bl, black, ble, black at edges.

|  | Appearance after heat aging | | | |
|---|---|---|---|---|
|  | 1 Hr. | 2 Hrs. | 3 Hrs. | 4 Hrs. |
| Stabilizer from Example No.: | | | | |
| No stabilizer | rbr | bl | | |
| Dibutyltin dilaurate | y | rbr | bl | bl |
| (2 parts/100 parts of resin) | | | | |
| Example 1 | c | vsy | vsy | sy |
| Example 2 | c | vsy | vsy | sy |
| Example 3 | vsy | vsy | vsy | sy |
| Example 4 | sy | sy | sy | y |
| Example 5 | vsy | vsy | sy | sy |
| Example 6 | sy | sy | y | y |
| Example 7 | sy | sy | sy | y |
| Example 8 | vsy | vsy | vsy | sy |
| Example 9 | sy | sy | sy | sy |
| Example 10 | vsy | vsy | sy | sy |
| Example 11 | vsy | vsy | sy | sy |
| Example 12 | vsy | vsy | vsy | sy |
| Example 12 in Geon 202 resin, a copolymer of vinyl chloride and vinylidene dichloride | sy | sy | sy | sy |
| Dibutyltin dilaurate in Geon 202 | oy | oy | bl | bl |
| Example 12 in VYNW resin, a copolymer of vinyl chloride and vinyl acetate | sy | sy | y | rbr |
| Dibutyltin dilaurate in VYNW resin | oy | bl | bl | bl |
| Example 13 | vsy | vsy | vsy | sy |
| Example 14 | vsy | vsy | vsy | sy |
| Example 15 | vsy | vsy | sy | sy |
| Example 16 | vsy | vsy | vsy | sy |
| Example 17 | grey | grey | grey | grey |
| in Ultron 300 resin (polyvinyl chloride) | c | c | c | vsy |
| in Geon 101 EP resin | c | c | c | vsy |
| Example 18 | c | c | vsy | vsy |
| Example 22 | vsy | vsy | vsy | sy |
| Example 23 | vsy | sy | sy | sy |
| Example 26 | y | y | y | y |
| in Ultron 300 Resin | c | c | vsy | y |
| Example 27 | c | vsy | vsy | sy |
| Example 29 | c | vsy | sy | y |
| Example 30 | light gray tint | | | |
| in Ultron 300 Resin | vsy | vsy | sy | sy |
| Example 31 | vsy | vsy | vsy | sy |
| Example 32 | vsy | vsy | sy | sy |
| Example 33 | vsy | vsy | sy | sy |
| Example 34 | vsy | vsy | sy | sy |
| Example 35 | vsy | vsy | vsy | vsy |
| Example 36 | sy | sy | br | bl |
| Example 37 | sy | sy | y | y |

Further tests were carried out to determine the heat stability of vinyl films containing a phosphate plasticizer and stabilized with an organotin mercaptide of the present invention. The results of these tests are indicated in the table below. In this table, oy indicates orange yellow, rb—red brown, and S-141 an aryl, alkyl phosphate plasticizer.

| Film | Composition | Appearance After Heat Aging | | | |
|---|---|---|---|---|---|
| | | 1 Hr. | 2 Hrs. | 3 Hrs. | 4 Hrs. |
| A | 100 parts Geon 101<br>35 parts DOP<br>15 parts S-141<br>2 parts dibutyltin dilauryl mercaptide. | c | vsy | vsy | sy |
| B | 100 parts Geon 101<br>35 parts DOP<br>15 parts S-141<br>2 parts Dimethyltin di-tert-laurylmercaptide. | c | vsy | vsy | vsy |
| C | 100 parts Geon 101<br>20 parts DOP<br>20 parts S-141<br>2 parts Dibutyltin dilaurate. | y | oy | | |
| D | 100 parts Geon 101<br>37.5 parts DOP<br>12.5 parts S-141<br>2.0 parts Dibutyltin dilaurate. | y | oy | rb | |

For films containing phosphate plasticizers, the results shown are much better than would be obtained using other stabilizers. For example, using the formulation of film A but substituting 2 parts of dibutyltin dilaurate for two parts of dibutyltin dilauryl mercaptide, the results of the heat tests were: 1 hr.—oy; 2hrs.—rbr; 3 hrs.—bl; 4 hrs.—bl.

Tests were carried out to determine the stability of vinyl films to light when compounded with an organotin of the present invention. For that purpose, the films of 5 mils thickness were exposed to the accelerated light action of an Atlas fadeometer. The results of these tests are as follows:

| Film | Composition | Results |
|---|---|---|
| E | 100 pts. GEON 101<br>40 pts. DOP<br>10 pts. G-25*<br>1 pt. Dibutyltin dithiocresol. | Specking at 500 std. Fading Hours. No embrittlement and only slight general discoloration at 1,000 Std. Fading Hours. |
| F | 100 pts. Geon 101<br>40 pts. DOP<br>10 pts. G-25*<br>1 pt. Dimethyltin di-tert-laurylmercaptide. | Like Film E. |
| G | 100 pts. Geon 101<br>40 pts. DOP<br>10 pts. G-25*<br>1 pt. Dibutyltin dilauryl mercaptide. | Specking at 600 Std. Fading Hours. No embrittlement and only slight general discoloration at 1,000 Std. Fading Hours. |
| H | 100 pts. Geon 101<br>40 pts. DOP<br>10 pts. G-25*<br>1 pt. Diphenyltin dilauryl mercaptide. | Like Film G. |
| I | 100 pts. Geon 101<br>40 pts. DOP<br>10 pts. G-25*<br>1 pt. Diamyltin dilauryl mercaptide. | Like Film G. |

*"Paraplex" a plasticizer made by Rohm and Haas and consisting essentially of polyesters.

While the invention has been described with particular reference to specific embodiments, it is to be understood that it is not to be so limited thereto but is to be construed broadly and restricted solely by the scope of the appended claims.

What is claimed is:

1. Dibutyltin di(2-benzothiazyl) mercaptide.

2. Process which comprises heating dibutyltin oxide with 2-mercaptobenzothiazole.

References Cited in the file of this patent

UNITED STATES PATENTS

| 2,258,718 | Rothrock | Oct. 14, 1941 |
| 2,344,002 | Rugeley et al. | Mar. 14, 1944 |
| 2,376,313 | Reiff | May 15, 1945 |
| 2,431,038 | Harris | Nov. 18, 1947 |
| 2,480,823 | Morris | Sept. 6, 1949 |
| 2,481,086 | Cleverdon et al. | Sept. 6, 1949 |
| 2,489,518 | Burt | Nov. 29, 1949 |

OTHER REFERENCES

Backer et al.: Rec. trav. chim., vol. 53, pages 1101–1112 (1934).

Chem. Abs., vol. 29, page 1061 (1935).

Gilman: O. S. R. D., No. 236, May 2, 1942. Declassified January 28, 1946, page 12.